(12) United States Patent
Zadeh et al.

(10) Patent No.: US 11,385,773 B2
(45) Date of Patent: Jul. 12, 2022

(54) SYSTEM AND METHOD FOR IDENTIFYING USERS BASED ON AT LEAST ONE PREFERENCE AND FRIENDSHIP STATUS

(71) Applicant: Zoosk, Inc., San Francisco, CA (US)

(72) Inventors: Shayan G. Zadeh, San Francisco, CA (US); Alexander F. Mehr, San Francisco, CA (US); Charles E. Gotlieb, San Francisco, CA (US)

(73) Assignee: Zoosk, Inc., Lehi, UT (US)

( * ) Notice: Subject to any disclaimer, the term of this patent is extended or adjusted under 35 U.S.C. 154(b) by 0 days.

(21) Appl. No.: 13/706,182

(22) Filed: Dec. 5, 2012

(65) Prior Publication Data

US 2013/0145288 A1    Jun. 6, 2013

Related U.S. Application Data

(60) Provisional application No. 61/567,010, filed on Dec. 5, 2011.

(51) Int. Cl.
| | | |
|---|---|---|
| G06F 3/048 | (2013.01) | |
| G06F 3/0484 | (2022.01) | |
| H04W 4/21 | (2018.01) | |
| H04W 4/021 | (2018.01) | |
| H04W 4/02 | (2018.01) | |
| H04M 1/72457 | (2021.01) | |

(52) U.S. Cl.
CPC ...... *G06F 3/0484* (2013.01); *H04M 1/72457* (2021.01); *H04W 4/021* (2013.01); *H04W 4/023* (2013.01); *H04W 4/21* (2018.02)

(58) Field of Classification Search
CPC ..... G06F 17/30; G06F 3/0484; G06F 17/3087

USPC .......... 705/7, 7.11–7.42; 715/753; 707/999.005, E17.014

See application file for complete search history.

(56) References Cited

U.S. PATENT DOCUMENTS

| | | | |
|---|---|---|---|
| 5,950,200 A * | 9/1999 | Sudai et al. | |
| 2003/0078976 A1* | 4/2003 | Gordon | 709/205 |
| 2004/0192339 A1* | 9/2004 | Wilson | H04W 64/00 455/456.1 |
| 2004/0220965 A1* | 11/2004 | Harville | G06F 17/30017 |
| 2004/0254721 A1* | 12/2004 | Saiki | 701/207 |
| 2005/0177614 A1* | 8/2005 | Bourne | H04L 51/32 709/200 |
| 2007/0032240 A1* | 2/2007 | Finnegan | H04M 1/72513 455/445 |
| 2007/0069901 A1* | 3/2007 | Tuck | C11D 3/50 340/573.1 |
| 2007/0073710 A1* | 3/2007 | Terrill et al. | 707/10 |
| 2008/0086261 A1* | 4/2008 | Robinson et al. | 701/200 |
| 2008/0140650 A1* | 6/2008 | Stackpole | G06F 17/3087 |
| 2008/0155100 A1* | 6/2008 | Ahmed | G06F 9/5011 709/226 |
| 2009/0024548 A1* | 1/2009 | Zhu et al. | 706/21 |
| 2009/0055238 A1* | 2/2009 | Baryshnikov | G06Q 10/06 705/7.19 |
| 2009/0100037 A1* | 4/2009 | Scheibe | 707/5 |
| 2011/0035674 A1* | 2/2011 | Chenoweth et al. | 715/745 |
| 2011/0113148 A1* | 5/2011 | Salmela et al. | 709/229 |
| 2011/0136477 A1* | 6/2011 | Van Erlach | 455/414.1 |
| 2011/0225510 A1* | 9/2011 | Lavrov et al. | 715/751 |

(Continued)

*Primary Examiner* — Tuan S Nguyen
(74) *Attorney, Agent, or Firm* — Innovation Partners LLC; Charles E. Gotlieb

(57) ABSTRACT

A system and method displays to a user nearby other user's compatible with that user.

18 Claims, 5 Drawing Sheets

(56) References Cited

U.S. PATENT DOCUMENTS

| | | | |
|---|---|---|---|
| 2011/0238755 A1* | 9/2011 | Khan | G06Q 50/01 709/204 |
| 2011/0302209 A1* | 12/2011 | Flinn | G06F 17/30699 707/780 |
| 2012/0220314 A1* | 8/2012 | Altman | G06Q 30/0207 455/456.3 |
| 2012/0265823 A1* | 10/2012 | Parmar et al. | 709/206 |
| 2013/0024105 A1* | 1/2013 | Thomas | H04W 4/023 701/410 |
| 2013/0080204 A1* | 3/2013 | Khorashadi et al. | 705/7.19 |
| 2013/0085861 A1* | 4/2013 | Dunlap | 705/14.58 |
| 2013/0143587 A1* | 6/2013 | Williams | H04W 4/023 455/456.1 |

* cited by examiner

SYSTEM AND METHOD FOR IDENTIFYING USERS BASED ON AT LEAST ONE PREFERENCE AND FRIENDSHIP STATUS

RELATED APPLICATIONS

This application claims the benefit of U.S. Provisional Patent Application Ser. No. 61/567,010 entitled, "Method and Apparatus for Identifying Nearby, Compatible Users" filed by Shayan Zadeh, Alex Mehr and Charles Gotlieb on Dec. 5, 2011, and the subject matter of this application is related to the subject matter of U.S. patent application Ser. No. 13/200,229 entitled, "System and Method for Selecting Compatible Users for Activities Based on Experiences, Interests or Preferences as Identified From One or More Web Services" filed on Sep. 21, 2011 by Shayan Zadeh and Alex Mehr, each having the same assignee as this application and each is incorporated herein by reference in its entirety.

FIELD OF THE INVENTION

The present invention is related to computer software and more specifically to location based-compatibility matching.

BACKGROUND OF THE INVENTION

Users of a web site service may be geographically distributed with some users nearby, and other users far away from any given user. What is needed is a system and method that can identify users not only nearby or otherwise convenient for the user to interact with, but also compatible with that user.

SUMMARY OF INVENTION

A system and method receives from a user, registration information, or provides such registration information to the user. Registration information may include a username and password. The user is allowed to login using that username and password. Profile and preference information may be received from the user. Profile information includes information about the user, and preference information includes information about other users with which the user may desire to interact. Social network information may be received. Social network information may include information about preferences or experiences of the user.

Information about the user's location may be received and stored, associated with the date and time of receipt. Such information may be received via conventional global positioning system signals that are relayed to a server from a user's mobile device which receives such signals and converts them into a latitude and longitude. All of the above information may be received from any number of users at any time, and may be updated as required.

A first user may be selected, and a determination may be made as to whether or not the selected user is in a vehicle. The determination may be made based on the location information of the user received at several different points in time to identify a speed at which the user may be moving. If the user is in a vehicle, in one embodiment, the user may be asked if the user is a passenger in the vehicle, and if no response is received or the user indicates that the user is not a passenger in the vehicle, if there are more users, the next user is selected and the method repeats for that user. If the user is not the driver, the method continues, and in one embodiment, the method continues whether or not the user is the driver.

Thresholds to be used to determine whether other users should be considered for display to the user are identified, for example based on the time the user has been registered to the website performing the method or incorporating the system of the present invention, past actions of the user with respect to selecting other users when such other users are displayed to the user as described herein, the number of other users near the user, and whether or not the user is in a vehicle as determined as described above.

In one embodiment, other users consistent with the thresholds identified are identified, either based on their distance from the user, or based on their distance to a public meeting space within a threshold distance of the user. Such identification may narrow down the other users to a more manageable number, though in one embodiment no such narrowing down is performed, and all the other users may be considered to be displayed to the user as described herein based on the other factors described below.

The first such other users selected, and a determination may be made as to whether the user is a friend of the selected user, and whether such other user is very nearby the selected user. In one embodiment, one user may designate the other user as a friend, or such designation may be automatically applied to the users based on their actions with respect to one another. For example, to users who have regularly interacted with one another may be designated automatically as friends.

If the selected other user is a friend of the selected user, in one embodiment, such other user is skipped for the purpose of display as described herein, and the next other user is selected. In one embodiment, if the selected user in the selected other user who are friends are very nearby one another, the two users may be identified as being on a date.

With respect to a selected other user who is not a friend of the selected user, a compatibility score may be identified between the two users based on the degree to which the profile characteristics of the other user match the preferences of the selected user, and optionally the degree to which the profile characteristics of the selected user match the preferences of the selected other user. A popularity score of the other user may be identified based on actions of other users with respect to the selected other user. Such actions may include clicking on the other users profile or messaging the other user or dating the other user, in one embodiment following the display of the selected other user based on a proximity match with any such other users.

The distance between the selected user and the selected other user or the distances between a public meeting space within a threshold distance of the selected user and within a threshold distance of the selected other user may be identified and a score may be identified based on such distance or distances. The various scores identified as described above may be weighted and summed to produce a total score.

If the total score exceeds a threshold, a link to the other user's profile and/or the distance between such users or between the identified public meeting space and the selected user may be displayed, optionally associated with a location of such public meeting space on a map. In one embodiment, such information may be displayed with information indicating the degree of compatibility between the selected user and the selected other user, or the degree of compatibility between the two users, such as via a colored dot, in which different colors (e.g. red, yellow or green) represent different degrees of compatibility. In one embodiment, as part of the profile information or based upon such profile information, each user, or the system and method, may identify whether or not each user is visible when such user is identified as an other user having a total score above the threshold. Before displaying such information about such other user, the visibility status of such other user is investigated. If such other user has a visibility status that indicates the other user must be notified before information about that other users displayed to the user, a notification is provided to such other user and such information about such other user is displayed to the selected user when such other user has provided permission, either to be displayed to the selected user or to be displayed to selected users generally.

If there are more other users identified for the selected user as described above, the next such other user is selected and processed as described above. Otherwise, if there are more users, the next such user is selected, a determination is made as to whether the selected user is in a vehicle, and the method continues as described above.

The user may view a list of the displayed other users nearby to that user, along with information about that other user such as the distance between the user and the other user or the distance to the coffee shop or other public meeting place that is near the two users, and optionally a photo of the other user and a visual indication of how closely the profile characteristics and social network information of the other user matches that of the user. The user may click on a link for the other user to display the profile of the other user, a link to send a friend request to the other user that will designate the users as friends if the other user approves the request, or may click a link to chat or e-mail the other user which are performed using conventional techniques. The various actions of the user and other user may be recorded for use as described herein. The location of any user may not be displayed to another user in one embodiment of the present invention.

Each selected user thus may view information about nearby other users, and may select any such other user displayed by clicking on the information about such other user, for example via a webpage or an application on a mobile device. If the user clicks on such other user, profile information about the other user is displayed, and the identifiers of the user, other user, the displayed distance of the other user and the location and/or distance of a public meeting space nearby both users, and the degree to which the compatibility of the other user or of the users was displayed to the user is recorded, along with the fact that the user had clicked the profile of the other user.

Each user action and each display of an other user to a user may be recorded, along with any pertinent distance and scores to allow the calculations described herein to be performed.

Various storage elements may be employed to store the data used as described herein electronically, such as memory or disk storage along with a conventional database.

In one embodiment, users may view other users who may not be near the user at the present time, but whose paths at different times from one another or at similar times or similar types of times have crossed or whose paths at similar times or similar types of times or at different times each have a point that is near to one another or near the same public meeting space. Paths that are regularly taken, such as from work to home or from work to a gym, may be weighted higher when used to identify other users than paths that are infrequently taken. A similar time may be a time within a threshold amount of time from another time. A type of time may be similar if the user is performing similar activities, such as going from work to home. Even though the times are dissimilar, one user may be able to adjust their schedule for a meeting by staying at work later one day to match the other user's schedule.

In one embodiment, the types of activities a user may be performing at a location the user remains in for at least a threshold period of time may be identified using a conventional commercial categorized map database. For example, a user may regularly attend a gym or various movie theaters, and a static location received over a period of time from the user's mobile device may be looked up in a map database (or the user may be asked or both) to determine the type of activity the user was performing. Other users who are similarly identified as frequently participating in the same types of activities or in compatible activities may be identified to one another. In one embodiment, compatible types of activities may be identified using regression analysis of users who have successfully been matched with one another. For example, someone who works long hours may be compatible with someone who travels frequently, even though the activities are not the same. The similarity and/or compatibility of the activities may be relaxed over time to encompass more users.

DETAILED DESCRIPTION OF A PREFERRED EMBODIMENT

Figure 1:
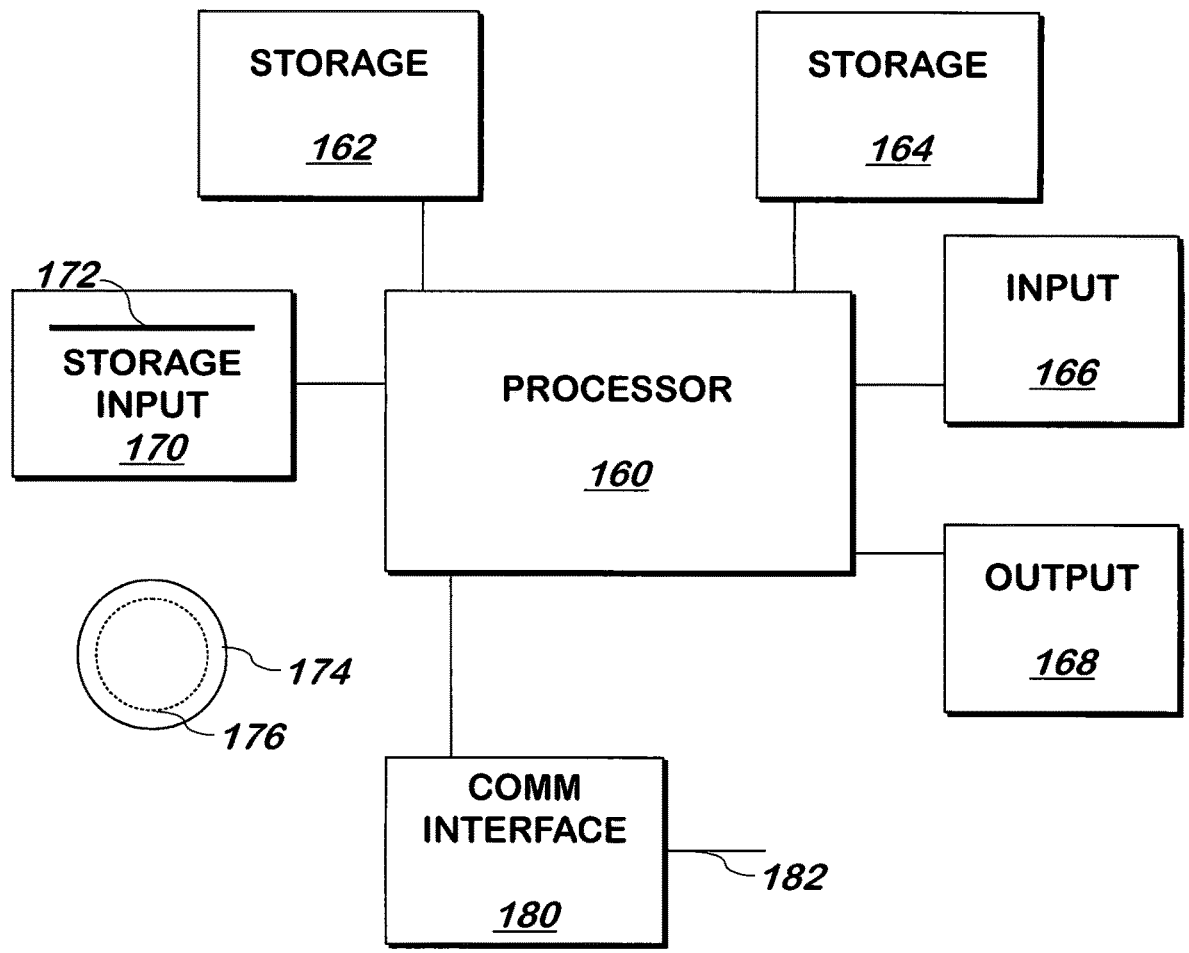
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150.

Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS SPARC ENTERPRISE M9000 SERVER running the SOLARIS operating system commercially available from ORACLE CORPORATION of Redwood Shores, Calif., a PENTIUM-compatible personal computer system such as are available from DELL COMPUTER CORPORATION of Round Rock, Tex. running a version of the WINDOWS operating system (such as XP, VISTA, or 7) commercially available from MICROSOFT Corporation of Redmond Wash. or a Macintosh computer system running the MACOS or OPENSTEP operating system commercially available from APPLE INCORPORATED of Cupertino, Calif. and the FIREFOX browser commercially available from MOZILLA FOUNDATION of Mountain View, Calif. or INTERNET EXPLORER browser commercially available from MICROSOFT above, although other systems may be used. Each computer system 150 may be a DROID 2 mobile telephone commercially available from MOTOROLA CORPORATION of Schaumberg, Ill. running the ANDROID operating system commercially available from GOOGLE, INC. of Mountain View, Calif. Various computer systems may be employed, with the various computer systems communicating with one another via the Internet, a conventional cellular telephone network, an Ethernet network, or all of these.

Receive/Provide/Store Registration Information and/or Log In.

Figure 2A:
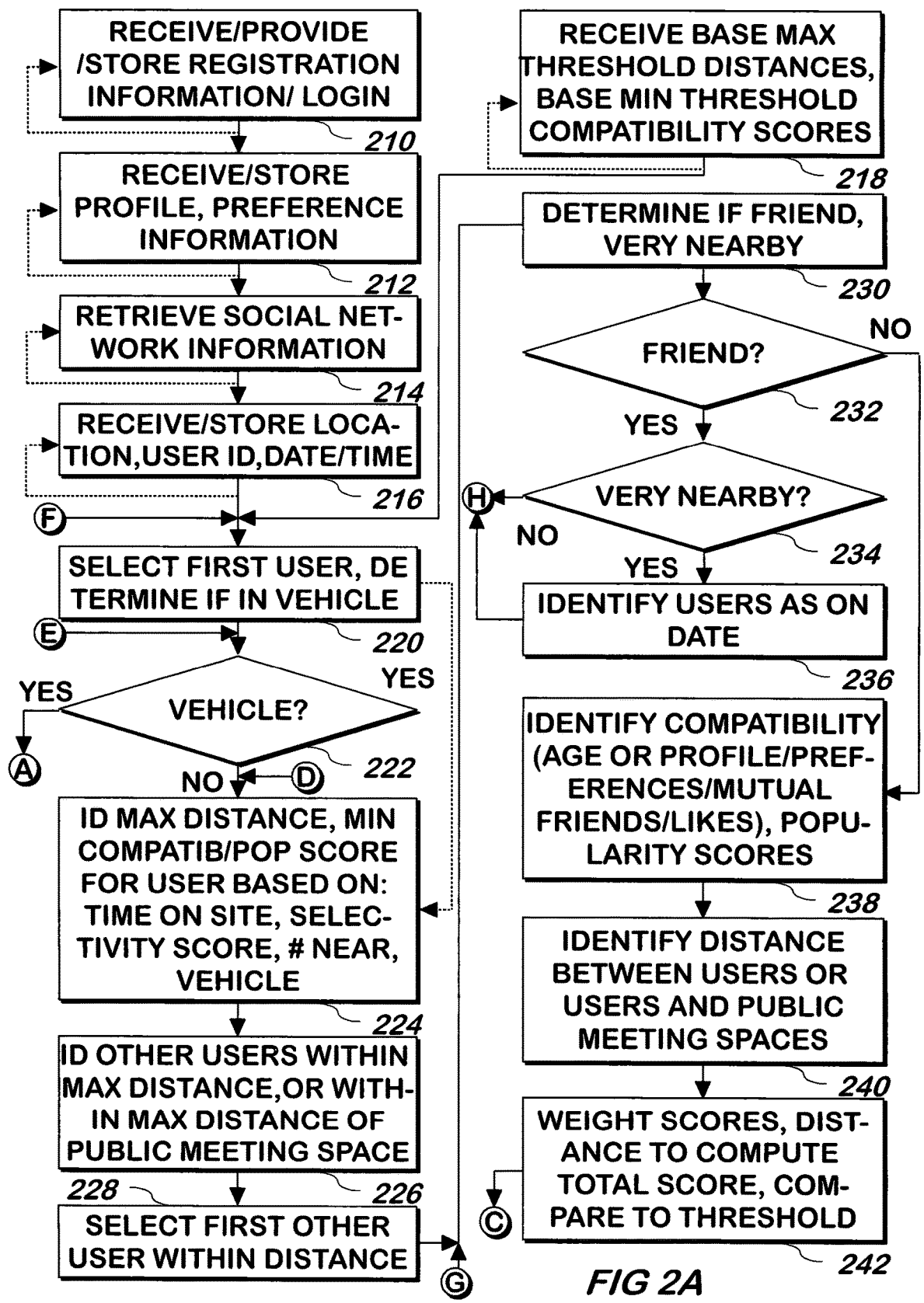
FIG. 2, consisting of FIGS. 2A, 2B, and 2C, is a flowchart illustrating a method of identifying and notifying users of nearby potential matches according to one embodiment of the present invention.
Figures 2B, 5:
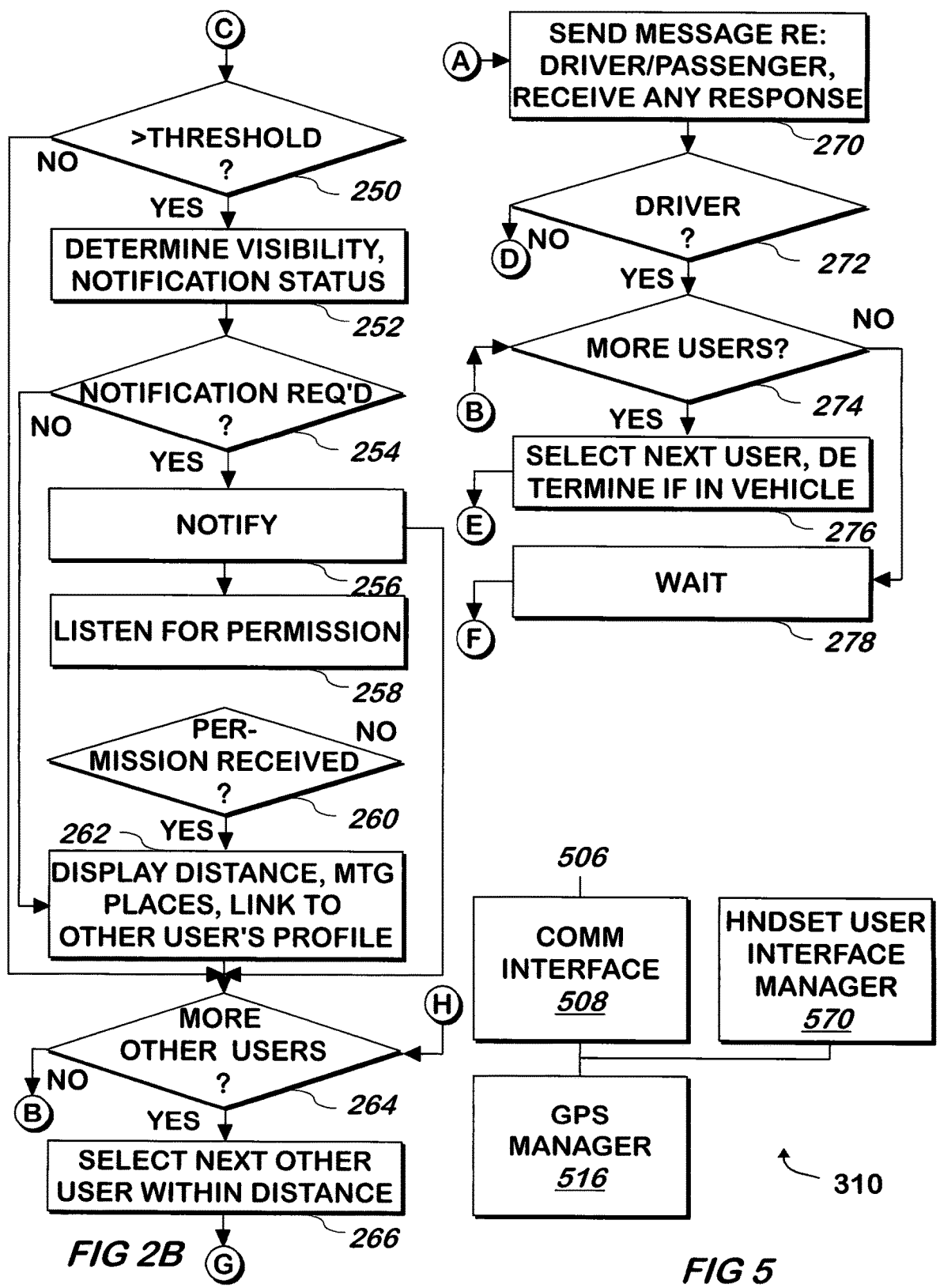
FIG. 5 is a block schematic diagram of a user system according to one embodiment of the present invention.
Figure 2C:
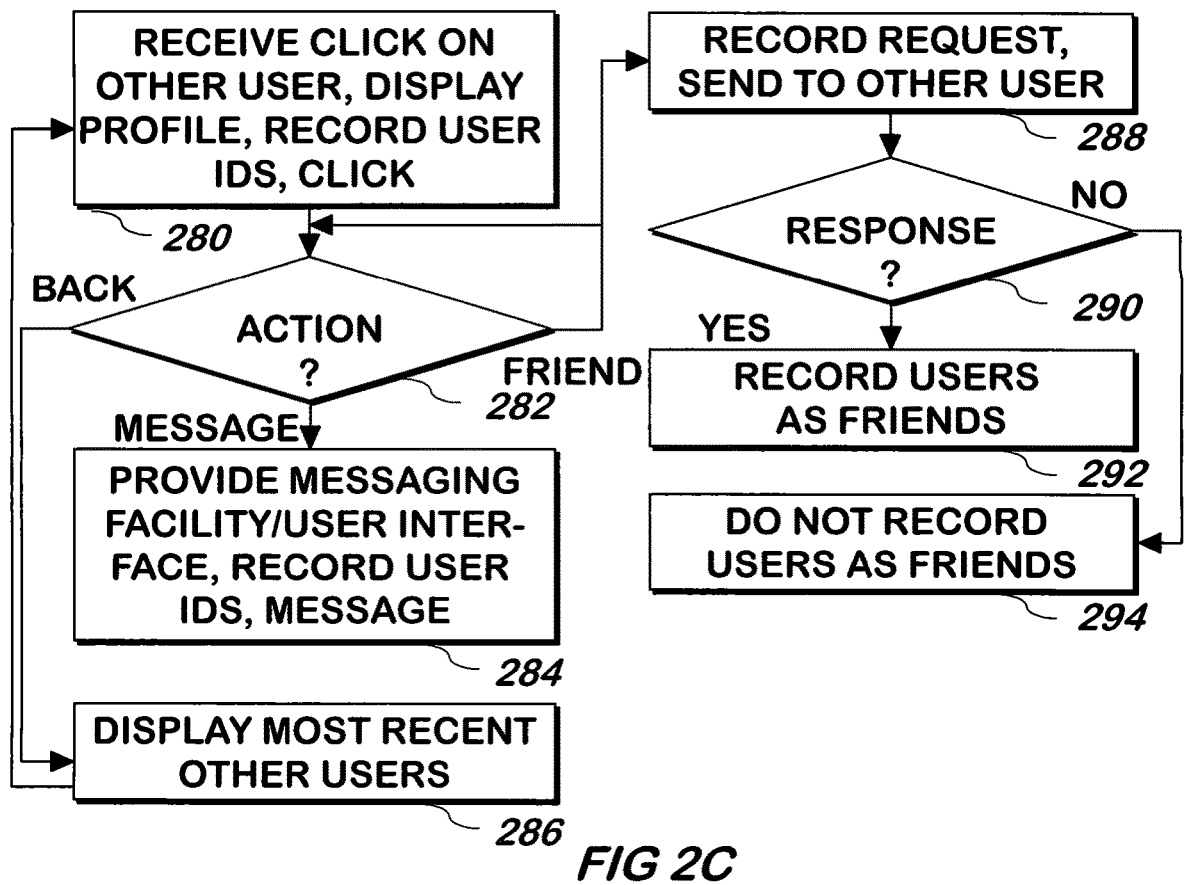

FIG. 2, consisting of FIGS. 2A, 2B and 2C, is a flowchart illustrating a method of identifying and notifying users of nearby potential matches according to one embodiment of the present invention. Referring now to FIG. 2, registration information is received, or user log in information is received 210. Registration information, including a username and password, are received from a user to register an account. In one embodiment, registration information may be received via an application on a mobile device or it may be received on a website via a computer with browsing capabilities or via a mobile device with browsing capabilities or it may be received in any other manner. In one embodiment, a check may be performed when registration information is received to verify that the username provided is not already associated with an account at the web site. Such registration information is stored as part of step 210 and may be used at any time by the user to log on to the user's account at the web site. If log in information is received, the received username and password may be verified to allow access to the specified account.

In one embodiment, social network access information may also be received from the user and stored as a part of registration information received at step 210. Social network access information or information that may be used to access one or more of the user's social network accounts, such as a FACEBOOK account or LINKEDIN account, may include an identifier for the social network or URL of the social networking website, as well as the user's social network username and user's social network password or other indication to allow access to the user's account on the social network. Such information may be received when the user grants permission to do so via an application on the social network site.

Registration information and/or log in information may be received from any number of users at any time, and the process of receiving and storing registration information may be an independently operating process, as shown by the dashed lines in the Figure.

Receive and Store Profile, Preference Information.

Profile information and preference information are received and stored, associated with the user identifier of the account from which such information was received 212. Profile information may be any information corresponding to or describing the user of the account, and it may include basic information, such as the user's age, gender, height and weight, religions, body type, etc., as well as other information about the user, such as interests, activities, taste in music, movies, books, and/or sports, etc. Profile information may be received as text via fields provided on an mobile application or web page, or as files, such as digital photos uploaded from the user's device via an uploading tool, or any other type of information received in any other manner.

Preference information may include any characteristics that the user prefers in a person to date or otherwise interact with, including desired physical characteristics, as well as desired interests, etc., and any other desired characteristics of a person that the user would most like to meet, communicate with, date, or interact.

In one embodiment, profile information received from the user may be made available to be viewed by other registered users of the web site, and preference information may not be made available to be viewed by any other users of the web site. In one embodiment, profile and preference information may be received from the user during one registration period, or updated registration information may be received from the user in multiple registration periods. Profile information and preference information, or updated profile information or updated preference information, for any number of users may be received and stored at any time, and the process of receiving and storing profile and preference information may be an independently operating process, as shown by the dashed lines in the Figure. In one embodiment, some profile information, such as the user's age, may not be updated once it is initially received and stored, or some profile information may be updated only after a specified length of time has passed since the last time it was updated, such as after 24 hours, or any profile information may be updated by the user at any time.

Retrieve Social Network Information.

Social network data is retrieved and stored associated with the user 214. In one embodiment, social network access information received from the user as part of step 212 and with the user's permission may be used to access the user's social network account via the social networking web site, and social networking data corresponding to the user's account may be retrieved, including any information provided to the social network by the user or the user's social network friends, such as social network profile information, social network friends or contacts information, social network "likes" or "check-ins" information (for example, if the social network is FACEBOOK), or any other social network data. In one embodiment, social network data for any number of users may be retrieved at any time, and the process of retrieving social network information may be an independently operating process, as shown by the dashed lines in the Figure.

Receive/Store Location, User Identifier, Date/Time.

Location information for the user is received and the location information is stored with the user identifier and timestamp 216. In one embodiment, location information, including the GPS coordinates of the user or the user's device, may be received on a regularly repeating basis whenever such information is available, as indicated by the dashed line in the Figure, and any such location information received may be stored with a timestamp indicating the date and time the information is received. Location information may be received for any number of users, and any location information received and stored for any other users may be used to identify potential matches for the user that are nearby, as described below.

Receive Base Max Threshold Distances, Base Minimum Threshold Compatibility Scores.

Base maximum threshold distances and base minimum threshold compatibility scores are received 218, such as from a system administrator, and such information may be stored. In one embodiment, a base maximum threshold distance is an upper-limit base threshold for the maximum allowable distance between two users for the users to be considered nearby to each other, and/or the base maximum threshold distance may be used to derive such threshold distance. In one embodiment, multiple base maximum threshold distances may be received, including an immediate maximum threshold distance, which may be used to identify nearby other users that are in the defined immediate range of the user in real time; a crossing paths maximum threshold distance, which may be used to identify other users that travel a path that approaches the user's path though not necessarily at the same time as the user; and a trip maximum threshold distance, which may be used to identify other users that are temporarily in the user's radar range, such as other users who may be on a business trip to the same city as the user; or any other maximum threshold distances. In identifying nearby potential matches, as described in more detail below, the distance between two users may be identified as the walking distance between the two users, such as the distance between the two users via surface streets, or it may be identified as an absolute distance, such as would be used by a crow flying.

In one embodiment, one or more vehicle maximum threshold distances may also be received, or vehicle threshold distance multipliers may be received, for the maximum allowable distance between two nearby users if one or both of the users are in a vehicle, as described below, and vehicle maximum threshold distances may be greater than immediate maximum threshold distances.

Base minimum compatibility scores may include a lower-limit threshold for minimum compatibility score that is calculated for a second user in order for that second user to be identified as a nearby potential match for the first user, as described in more detail below, or may be used to derive such a threshold.

Select First User.

A first radar user is selected 222, and a determination is made whether the selected user is in a vehicle as part of step 222. A radar user is a user who has enabled a location matching capability, such as is described herein, and is currently logged in via step 210. In one embodiment, the selected user may be determined to be in a vehicle if location information received for the user indicates that the user's location is changing at a rate faster than a speed threshold. For example, if GPS coordinates received for the user over a period of time indicate that the user is moving at an average speed of over 5 miles per hour, it may be determined that the user is in a vehicle.

If Selected User is Traveling in a Vehicle.

Send Message Querying Whether the User is the Driver or Passenger of Vehicle and Receive any Response.

In one embodiment, if the user is traveling in a vehicle 222, then a message may be sent to the user querying whether the user is the driver or a passenger of the vehicle in which the user is traveling, and any user response is received 270. In one embodiment, the message sent to the selected user may also query if the user wishes to receive nearby potential match information while the user is in the vehicle (if the selected user is not the driver of the vehicle). In one embodiment, no message may be sent to the user if the user is determined to be in a vehicle, and no response may be received, and in such embodiment, step 224 follows step 220 unconditionally. In one embodiment, the message may be sent to the user in the vehicle, and if no response is received, the user may be identified as the driver of the vehicle.

If Selected User is the Driver of the Vehicle, then Check for More Users.

If the selected user is the driver of the vehicle 272, then a determination is made whether there are additional radar users who have not been processed as users in the most recent iteration. If there are no additional radar users for which to identify nearby potential matches, as described below, then the method waits 278 until the end of an iteration period and then continues at step 220.

If additional radar users exist for which to identify nearby potential matches 274, then the next such user is selected 276.

If Selected User is not Traveling in a Vehicle, or if Selected User is Traveling in a Vehicle but is not the Driver of the Vehicle.

Identify Maximum Distance, Minimum Compatibility/Popularity Score for User Based On: Time on Web Site, Selectivity Score, and Number of Other Users Near.

If the selected user is determined not to be traveling in a vehicle 222, or if the selected user is traveling in a vehicle but is not the driver of the vehicle 272, or in the embodiment in which step 224 follows step 220 unconditionally, then the selected user's maximum distance threshold, minimum compatibility score threshold and minimum popularity score threshold are identified based on factors such as the amount of time that the selected user has had an account on the web site, the selected user's selectivity score, the number of other users that are within the selected user's base maximum distance, and whether the selected user is in a vehicle 224.

In one embodiment, the selected user's maximum distance threshold, minimum compatibility threshold and minimum popularity threshold may be lowered or raised or adjusted in any manner from the base maximum and minimum thresholds received as a part of step 218 based on various factors. For example, if the factor is length of time that the user has had an account with the web site, in one embodiment, the selected user may be assigned a greater maximum distance threshold if the user has been registered with the web site operating some or all of the method of FIG. 2 for a longer period of time, than if the user has been registered a shorter amount of time, thereby increasing the size of the area in which nearby potential matches may be identified for the selected user, or the selected user may be assigned a lower minimum compatibility threshold and/or a higher or lower minimum popularity threshold, or any or all of the above. If the selected user has had an account with the web site for a very short time, then the selected user's maximum distance threshold may be low, and/or the minimum compatibility threshold may be high, and/or the minimum popularity score threshold may be low, or any of the selected user's thresholds may be determined in any way.

The selected user's selectivity score may be a function of who and where the selected user has previously indicated interest in meeting other users that have been identified as nearby potential matches, and such score may be used to adjust one or more other thresholds described herein. For example, the selected user's maximum distance may be decreased if the user's selectivity score indicates that the user is more willing to meet with other users if they are close by, or the selected user's minimum compatibility may be increased and maximum distance increased if the selected user's selectivity score indicates that the user is willing to meet other users that are far away but only if the other user very closely match the selected user's preferences. Willingness to meet may be indicated by the percentage of time the user views the profiles of, or chats with, other users.

The number of other users near the user may be identified using location information received from the selected user as well as other users. In one embodiment, a large number of other users nearby may indicate that the selected user is in a public meeting location, such as a coffee shop, and in such a case, the selected user's maximum distance may be decreased, and/or the selected user's minimum compatibility/popularity threshold may be decreased.

If the selected user is traveling in a vehicle, then the selected user's maximum distance threshold may be higher than if the user was not traveling in a vehicle.

Identify Other Users within Maximum Distance or within Maximum Distance of Public Meeting Space.

Other users within the selected user's maximum distance or within a base or other maximum distance from a nearby public meeting space that is within the user's maximum distance are identified 226. In one embodiment, location information received for the user and for other users may be used to identify other users within such distance thresholds. In one embodiment, an other user that is not within the selected user's maximum distance threshold may be identified if the selected user is within the maximum distance threshold of the same public meeting space for which the other user is within the base maximum distance threshold.

Select First Other User within Distance.

A first other user identified within the selected user's maximum distance threshold, or within the base maximum distance threshold of a public meeting space that is within the selected user's maximum distance threshold, is selected 228.

Determine if Friend and/or Very Nearby.

A determination is made whether the other user within the selected user's maximum distance range is already a friend or contact of the selected user, and if so, a determination may be made whether the two users are very nearby to each other 230. In one embodiment, two users may be determined to be very nearby if they are in extreme proximity to one another, such as if they are within a very near distance threshold, such as no more than twice the GPS resolution of the user with the lowest resolution of the two users.

Friend and Nearby.

Identify Users as on Date.

If the second user is identified as a friend 232 and the second user is determined to be very nearby 234, then the user and the second user may be identified as being on a date, and such information is stored 236.

Friend and not Nearby.

If the second user is identified as a friend of the selected user 232 and the two users are determined not to be very near 234, then the method continues at step 264.

Not Friend.

Identify Compatibility (Age or Profile/Preferences/Mutual Friends/Likes) and Popularity Scores.

If the selected other user ("second user") is not identified as a friend of the selected user 232, then a compatibility score and popularity score may be determined for the second user 238. In one embodiment, the second user's compatibility score may be determined by comparing the selected user's preference information with the second user's profile information to determine how well the selected other user matches the selected user's preferences. This one-way match may be used, or the reverse match may be employed to incorporate a two-way match into the compatibility score, as described in the related application. Additionally, social networking data for both users may be used to determine if the two users share any mutual friends or have any similar interests, activities, taste in music and/or any other mutual likes or mutual interests, and such factors may also be used in determining the second user's compatibility score. In one embodiment, the compatibility score for a user that shares interests and/or social network friends with the selected user may be higher than the compatibility score for a user that does not share any interests or mutual social network friends with the selected user.

One or more popularity scores for the second user may be determined as a function of the number of other users that have previously indicated an interest in meeting or interacting with the second user, or have previously interacted with the second user after viewing the second user's profile information, or have previously viewed the second user's profile, as described below. In one embodiment, the second user's popularity score may be greater if many users indicate an interest in meeting or interacting with the second user or lower if few users indicate an interest in meeting or interacting with the second user. In one embodiment, popularity may be affected to a greater degree if the other users' activities with respect to the second user were performed after viewing the second user via a proximity match as described herein than if such actions were performed after a different type of match, such as a conventional search.

Identify Distance Between Two Users Or Distance Between Each User And Public Meeting Space.

The distance between the selected user and the second user is determined 240. In one embodiment, the distance between two users may be determined as the distance calculated from the location of one user to the location of the second user, or it may be determined as the distance between each user and the same public meeting space, such as if the two users are closer to a public meeting space than they are to each other.

Weight Scores and Distance to Compute Total Score and Compare Total Score to Threshold.

The scores determined for the second user as part of step 238 and the distance between the two users determined as part of step 240 are weighted and a total score is computed for the second user 242. The second user's computed total score is compared 242 to the selected user's total score threshold to determine if the other user may be a nearby potential match for the selected user. In one embodiment, the other user's scores and distance information may be weighted such that a user with a low compatibility score that is closer in distance to the selected user or a meeting space nearby the selected user may be identified as a nearby potential match, and another user with a higher compatibility score may not be identified as a nearby potential match if the distance between the two users is great. In one embodiment, the weights are selected via conventional regression analysis techniques to maximize the score for other users to which the user will likely send a message and minimize the score for other users for which such a message is unlikely.

If Total Score is Below Threshold, Check for More Other Users.

If the second user's total score is below a total score threshold 250, then the second user may not be identified as a nearby potential match for the selected user, and a determination is made 264 whether additional other users are nearby the selected user.

If No More Other Users are Nearby, Wait.

If no other nearby users are identified 264, then the method continues at step 274.

If Total Score is Greater than Threshold.

Determine Visibility and Notification Status.

If the second user's total score is greater than the total score threshold 250, then the second user may be identified as a nearby potential match, and the second user's visibility level and notification status are determined 252. In one embodiment, a user's level of visibility may be set to "visible to everyone," "not visible" (i.e. not participating), "visible with permission," or any other visibility level. A user whose level of visibility is set to "visible to everyone" may be identifiable as a nearby potential match for any other users of the web site and may be made visible to any other user for which the "visible to everyone" user is identified as a nearby potential match. A user whose level of visibility is set to "not visible" may not be identified or made visible as a nearby potential match for any other user and, in one embodiment, also may not have nearby potential matches identified for the user. If a user's level of visibility is set to "visible with permission," then the user may be identifiable as a nearby potential match for other users. If such a user (User A) is identified as a nearby potential match for another user (User B), then User A may be notified of the match and given the option of being visible or not visible to User B.

In one embodiment, the second user's desired level of visibility may have been received from the second user as a part of step 212 above. In one embodiment, if no indication of desired visibility level has been received from the second user, a default visibility level setting may be used, such as "visible to everyone" if the second user is a male user, and "visible by permission" if it is a female user.

If Notification is Required.

Notify.

If the second user's level of visibility indicates that he or she requires notification and/or needs to give permission before he/she may be made visible to any other user 254, then the second user is notified 256 that he or she has been identified as a nearby potential match for the selected user. In one embodiment, the second user may be notified that he/she has been identified as a potential match for the selected user, and profile information profile information corresponding to the selected user may be provided. Permission may be requested to make the nearby potential match visible to the selected user 256.

If Permission is Required, Listen for Permission.

The method listens for permission from the second user 258. If permission is not received 260, the method continues to listen for permission 258.

If Permission is Received, or No Permission is Required.

If permission is received from the second user identified as a nearby potential match 258, or if no permission is required by the second user 254, then distance information, public meeting place information, and a link to the nearby potential match's profile may be displayed 262 to the selected user. Distance information may include how far the nearby potential match is from the selected user, or how far a public meeting place is from the selected user. Public meeting place information may include details about a nearby public meeting space, such as the location and/or identifier of the public meeting space. In one embodiment, a visual indication of the second user's compatibility and/or popularity score is displayed with the other information described above, such as by displaying a colored dot, with the color indicating one or both such scores.

A determination is made whether any additional other users are within the selected user's maximum distance threshold.

If More Other Users within Distance, Select Next Other User within Distance.

If more other users are identified within the selected user's maximum distance threshold 264, then the next such identified other user is selected 266, and the method continues at step 230.

If No More Other Users within Selected Users Distance.

If no more other users are identified within the selected user's maximum distance threshold 264, then the method continues at step 274.

Receive Click on Other User, Display Profile, and Record User Identifiers and Received Click.

If the selected user requests to view the profile of a nearby potential match (i.e. a second user that has been made visible to the selected user), such as by clicking on the link displayed to the selected user as part of step 262, then the selected user's click is received, and profile of the selected user's nearby potential match is displayed 280. In one embodiment, the user identifier of the selected user and the user identifier of the nearby potential match whose profile is viewed by the selected user are recorded along with an indication that the nearby potential match's profile was viewed by the selected user, the distance of the user to the nearby potential match or to the public meeting place, and the compatibility and/or popularity scores 280. In one embodiment, such a click or request to view a user's profile may be recorded and subsequently used in determining the popularity score of that user, such as at step 238, and the selectivity score of the user performing such click.

In one embodiment, the user may request an action when the profile of the selected nearby potential match is displayed, such as a request to go back to the display of nearby potential matches or a request to send a message the displayed user identified as a nearby potential match.

If Action Is Back.

Display Most Recent Other Users.

If a request to go back is received from the selected user 282, the selected user's most recently identified nearby potential matches (based on the selected user's current location) are displayed to the selected user. In one embodiment, previously displayed potential matches may also be displayed via a user interface control.

If Action is Message.

Provide Messaging Facility/User Interface and Record User Identifiers and the Message.

If the received action is a request to send a message 282, then a user interface for messaging, such as instant messaging or e-mail messaging, may be provided or any other messaging facility may be provided, and one or more messages may be sent using such user interface or facility 284. Additionally, the user identifier of the selected user and user identifier of the selected nearby potential match may be recorded or stored 284 along with an indication that the two users interacted.

If Action is Friend.

If the user requests to designate the selected nearby potential match as a friend 282, such request is recorded and sent to the selected nearby potential match 288, and the method continues at step 282. If the selected nearby potential match accepts the request 290, the two users are recorded as friends 292, and otherwise 290, the two users are not recorded as friends 294.

System.

Figure 3:
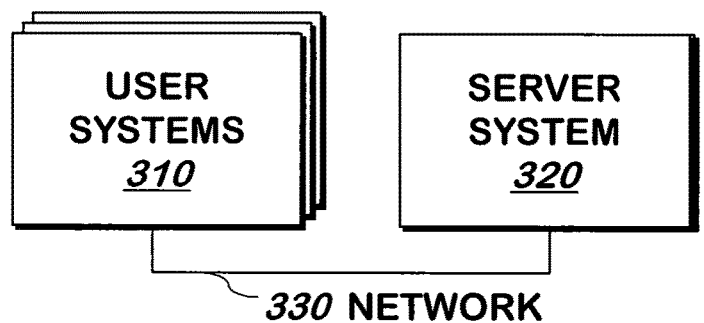
FIG. 3 is a block schematic diagram of a system, consisting of a server and one or more user systems for identifying and notifying users of nearby potential matches according to one embodiment of the present invention.
Figure 4:
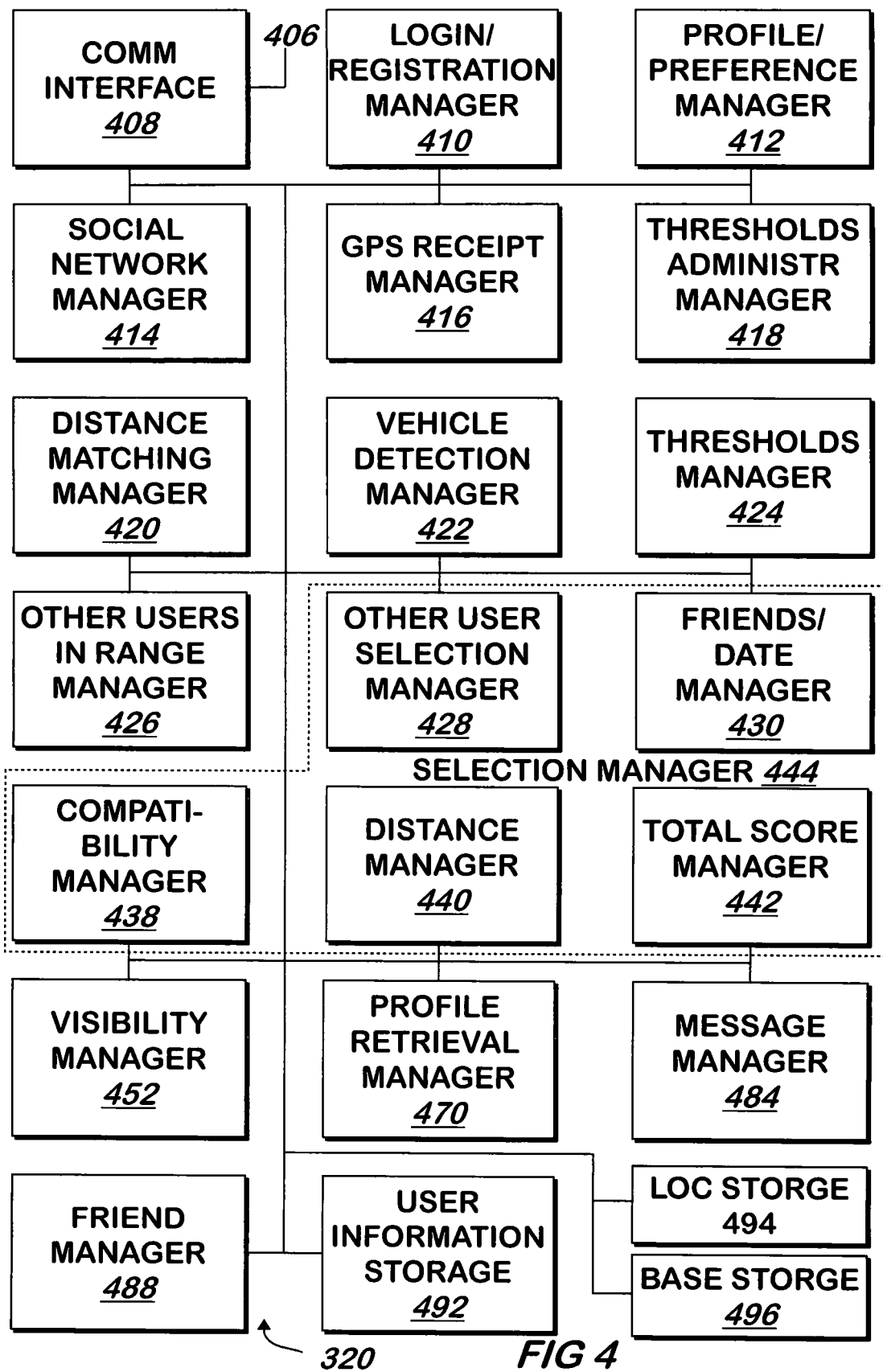
FIG. 4 is a block schematic diagram of the server of FIG. 3 according to one embodiment of the present invention.

FIG. 3 is a block schematic diagram of a system for identifying and notifying users of nearby potential matches according to one embodiment of the present invention. FIG. 4 is a block schematic diagram illustrating a server system 320 of FIG. 3 in more detail according to one embodiment of the present invention. FIG. 5 is a block schematic diagram illustrating a user system 310 of FIG. 3 in more detail according to one embodiment of the present invention. Referring now to FIGS. 3, 4 and 5, the system may contain any number of user systems 310 and a server system 320 though other arrangements may be used. Server system 320 and user system 310 operate as described herein and include a respective communication interface 408 and 508, coupled to network 340, and which may include a conventional communication interface running suitable communication protocols, such as Ethernet, TCP/IP or both. In one embodiment, unless otherwise noted herein, all communications in and out of the server system and user systems 310 are made via input/output 406 of communication interface 408 and input/output 506 of communication interface 508, respectively, and all systems communicate via network 340, which may include a conventional Ethernet network, the Internet or both.

A user registers with the server system 320, or logs in to the server system 320, using user system 310 that may include a conventional wireless communication device, such as a cell phone, with a conventional browser coupled to the Internet using suitable communications techniques.

When the user requests a web page from user interface manager 424, user interface manager 424 provides a web page, including one or more links to indicate one or more actions, such as a link to register or log in. Web pages are described herein for certain actions, however, such actions may be performed via an application on the user system 310. In such an embodiment, handset user interface manager 570 receives the information described herein and forwards it to the element of FIG. 4 that receives it as described herein.

If the user requests to register an account, such as by clicking the register account link on the webpage provided by user interface manager 620, or requests to log in to an account, such as by clicking the log in link, user interface manager 620 provides the request to login/registration manager 410, which builds a web page containing suitable user interface elements that allow the user to provide registration information, or log in information, described above, and returns it to the user's browser in response. The user fills out the web page with the registration or log in information, including a username and corresponding password, as described above, and any other information required to register an account or log in to an account. In one embodiment, if the request is to register a new account, login/registration manager 410 may check to verify that the username and password are not already in use by another account on the web site.

When the user has registered or logged in to an account, log in/registration manager 410 may provide a web page including a link to provide or update profile and/or preference information, and any number of other links corresponding to any other actions. In one embodiment, log in/registration manager 410 may also display potential matches identified for the user, as described in more detail above and below. Log in/registration manager 410 may install a conventional cookie on the user's device. The cookie may contain an encoded user identifier to allow the user to be identifiable by other elements. Conventional URL parameter passing techniques may be used by adding an encoded user identifier to the right of the domain in the URL of any link. Other similar techniques may be used.

If the user requests to provide or update profile information and/or preference information as described above, such as by clicking the update profile/preference information link on the web page provided by log in/registration manager 410, log in/registration manager 410 provides the request to profile/preference manager 412, which builds a web page, or web pages, containing suitable user interface elements to allow the user to provide profile information describing characteristics of the user and/or preference information, including fields into which the user may enter text information including a social network user identifier and password and one or more uploading tools which the user may use to upload files from the user's computer, such as digital photographs as described above, and returns it to the user's browser in response. In one embodiment, profile/preference manager 412 may allow the user to provide changed values for some profile information, such as the user's age information, or may allow the user to provide changed values for profile information only after a specified amount of time has passed since the last time that the user provided changed profile information, such as only after twenty four hours, or profile/preference manager 412 may allow the user to provide updated or changed profile information at any time. When profile/preference manager 412 receives updated profile information or preference information from the user, profile/preference manager 412 stores the information in user information storage 492 associated with the user identifier.

Occasionally, social network manager 414 may retrieve from one or more social network websites social network data corresponding to each user stored in user information storage 492 and store such retrieved information in user information storage 492 associated with the user identifier of the user. To retrieve social network data, social network manager 414 may retrieve social network access information, including a social network username, associated with the user identifier from user information storage 492, and social network manager 414 may use the social network access information to retrieve social network data, including the user's social network friends, social network likes information, such as information corresponding to posted content that the user likes, as well as bands, movies, books, activities, interests, etc) if the social network is FACEBOOK, and any other information provided to the user's social network by the user. In one embodiment, social network manager 414 may retrieve and store social network data for any number of users at any time and other conventional methods of retrieval may be used. In one embodiment, some of log in/registration manager 410 may be part of the social network server to which the user logs in, the user logs in via their social network user identifier and password, and the social network user identifier may be stored by log in/registration manager 410 in user information storage 492. The social network information may be requested with the social network user identifier retrieved by social network manager 414.

GPS receipt manager 416 receives location information for each user having information stored in user information storage 492, along with timestamp information and a user identifier for the user for which the location information is received. GPS receipt manager 416 may store any received location information in location storage 494 associated with the user identifier of the user for which the location information is received and the date and time for when the location information is received. In one embodiment, GPS receipt manager 416 may receive location information for a user at regular intervals, such as every 5 seconds or any other interval, as conventional current location coordinates (i.e. latitude, longitude) from handset GPS manager 516 of user system 310, along with the user identifier of the user for which the location information is received. Handset GPS manager 516 may read such location coordinates from a conventional GPS receiver (not shown), at intervals or at any time, and handset GPS manager 516 may send such information to GPS receipt manager 416.

In one embodiment, any conventional map databases, including databases associating GPS coordinates or other location information with place identifiers, may also be received, such as by system administration manager 418, and stored in location information storage 494. System administration manager 418 may also receive base information, such as the base maximum threshold distances and base minimum threshold compatibility and/or popularity scores described above, and system administration manager 418 may store such information in base storage 496.

Distance matching manager 420 selects a first registered user from whom location information has recently been received, as described above, builds a radar object including the user identifier of the selected user, and sends the radar object to vehicle detection manager 422.

Vehicle detection manager 422 receives the radar object and attempts to detect if the selected user is in a vehicle. To detect if the selected user is in a vehicle, vehicle detection manager 422 may calculate the speed at which the second user is traveling, such as by calculating the distance that the selected user travels in a given period of time using the most recent two or more location information associated with the received user identifier in location information storage 494. Vehicle detection manager 422 may compare the selected user's calculated speed against a vehicle speed threshold, and if the speed calculated for the selected user exceeds the vehicle speed threshold, vehicle detection manager 422 may detect that the selected user is in a vehicle.

If vehicle detection manager 422 detects that the selected user is in a vehicle, it may signal handset user interface manager 570 of user system 310 that the selected user may be in a vehicle, or vehicle detection manager 422 stores an indication in the radar object that the selected user is in a vehicle and provides the radar object to threshold manager 424.

If vehicle detection manager 422 signals handset user interface manager 570 of user system 310, handset user interface manager 570 may receive the signal from vehicle detection manager 422 and query the selected user whether the selected user is the driver of the vehicle or a passenger of the vehicle, as described above. In one embodiment, the selected user may receive the query and respond, indicating whether the user is the driver of the vehicle, and handset user interface manager 570 may receive such a response, or the selected user may not respond, and handset user interface manager 570 may not receive a response. If handset user interface manager 570 receives a response from the user, it sends the response to vehicle detection manager 422 along with the user identifier of the selected user.

Vehicle detection manager 422 receives any response from handset user interface manager 570 and stores such a response, or an indication that no response was received, in the radar object and sends the object to threshold manager 424. In one embodiment, vehicle detection manager 422 may determine a non-response from the user or from handset user interface manager 570 after a threshold period of time an indication that the user is the driver of the vehicle.

Threshold manager 424 receives the radar object, including the indication whether the user corresponding to the object is in a vehicle and/or whether the selected user is the driver of the vehicle if he/she is in a vehicle, and threshold manager 424 determines the maximum distance threshold, minimum compatibility score threshold, and minimum popularity score threshold for the selected user, as described above, as described above, using the amount of time that the selected user's account has been in existence, the selected user's selectivity score (which it calculates as described above using the information storage in user information storage 492), the number of other users nearby (from location information storage 494), and whether the selected user is in a vehicle, and any other information as described above. In one embodiment, threshold manager 424 may retrieve any user information associated with the selected user from user information storage 492. In one embodiment, threshold manager 424 adds the maximum distance threshold, minimum compatibility score threshold, and minimum popularity score threshold to the radar object, and threshold manager 424 sends the radar object to other users in range manager 426.

Other users in range manager 426 receives the radar object and identifies other users within the selected user's maximum distance threshold as other users whose location information indicates that such other user is within the selected user's maximum distance threshold from the selected user's location and/or other users whose location information indicates that such other user is within a distance threshold from the location of a public meeting space that is within the selected user's maximum distance threshold from the selected user's location, as described above. To identify other users within the selected user's maximum distance threshold, other users in range manager 426 may retrieve location information corresponding to the selected user and location information corresponding to other users from location storage 494 and retrieve location information and/or place identifiers corresponding to public meeting spaces and/or any other places from a conventional map database in location information storage 494. Other users in range manager 426 may add the selected user's location, such as GPS coordinates and/or place identifier, to the radar object, and other users in range manager 426 may also add the user identifier(s) of any other users that are identified as within the selected user's maximum distance threshold. Other users in range manager 426 sends the radar object to other user selection manager 428.

Other user selection manager 428 receives the radar object from other users in range manager 426, and other user selection manager 428 selects the first other user, as described above, and sends the radar object to friend/date manager 430. To select the first other user, other user selection manager 428 may mark in the radar object the first user identifier corresponding to an other user identified within the selected user's maximum distance threshold. In one embodiment, other user selection manager 428 may mark the user identifier as "selected other user" or "second user", as described above.

Friend/date manager 430 receives the radar object and determines whether the selected user and the selected other user, or second user, are friends, such as friends through the service or social network friends or any other type of friends, as described above. In one embodiment, friend/date manager 430 may determine that the two users are friends through the service if an indication of such is identified in user information storage 492, such as the user identifier of the selected user being linked to the user identifier of the second user, or friend/date manager 430 may retrieve social network data corresponding to each user from user information storage 492 to determine if the two users are social network friends via a social network, such as FACEBOOK or LINKEDIN.

If friend/date manager 430 determines that the selected user and second user are friends, friend/date manager 430 may determine how close the two users are to each other using location information corresponding to each user in location storage 494. If the selected user and the second user are determined to be friends, and are also determined to be very nearby each other, as described above, then friend/date manager 430 may determine that the two users are on a date, and friend/date manager 430 may store any date information, including the user identifier of each user on the date as well as the date and time of the date, in user information storage 492 with an indication that the two users may be on a date. In one embodiment, friend/date manager 430 may check to see if the two users have already recently been logged as being on a date in user information storage 492 before creating a duplicate record of such a date.

If friend/date manager 430 determines that the selected user and second user are friends but are not very near to each other, then friend/date manager 430 may mark the user identifier of the identified friend as such in the radar object and send the radar object to other user selection manager 428 along with a signal to select the next other user in the radar object.

Other user selection manager 428 receives the radar object and signal from friend/date manager 430 and marks the next other user identifier in the radar object as the selected other user or second user, unmarks the previous user as the selected other user or second user, and marks the previous user as having been processed as described above, and sends the radar object to friend/date manager 430, as described above.

If friend/date manager 430 determines that the selected user and other user are not friends, then it sends the radar object to compatibility manager 438.

Compatibility manager 438 receives the radar object from friend/date manager 430 and determines a compatibility score and one or more popularity score(s) for the selected other user in the radar object. To compute the compatibility score for the selected other user, as described above, compatibility manager 438 may retrieve profile information, including age information, associated with the user identifier of the selected other user and retrieve preference information (and age information) corresponding to the user identifier associated with the radar object from user information storage 492, and it may retrieve social network data, including social network friends information and social network likes information, corresponding to both users in user information storage 492. Compatibility manager 438 may compute the selected other user's popularity score(s), as described above, using the information in from user information storage 492. When compatibility manager 438 has determined the compatibility score and popularity score(s) for the selected other user, compatibility manager 438 adds the scores to the radar object and sends the radar object to distance manager 440.

Distance manager 440 receives the radar object and identifies the distance between the user corresponding to the object and the other user selected in the object. To identify the distance between the two users, distance manager 440 may retrieve location information corresponding to the selected other user from location storage 494 and distance manager 440 may use location information in the object or retrieve location information associated with the user corresponding to the radar object from location storage 494. In one embodiment, distance manager 440 may also retrieve location information corresponding to public meeting spaces from the conventional map database in location storage 494, and distance manager 440 may calculate the distance between the two users as the map distance between the two users or as the map distance between each user and an identified public meeting space, as described above. When distance manager 440 has calculated the distance between the two users, distance manager 440 may add the calculated distance or distances and the location and name of the public meeting space for each of those near to both users to the radar object and send the radar object to total score manager 442.

Total score manager 442 receives the radar object from distance manager 440, and total score manager 442 may weight the scores stored in the object for the selected other user and weight the distance, or a score calculated for the distance, between the two users or between the users and a public meeting space (i.e. a nearby coffee shop or a coffee shop open at the time and for at least a threshold amount of additional time) to compute a total score for the selected other user, as described above. In one embodiment, total score manager 442 may compare the total score computed for the selected other user to a total score threshold, as described above, and if the total score is greater than the total score threshold, total score manager 442 may mark the selected other user in the radar object as a nearby potential match. If the selected other user's total score is not greater than the total score threshold, total score manager 442 may mark the selected other user as not a nearby potential match, or total score manager 442 may not mark the selected other user as a nearby potential match. When total score manager 442 has stored (or elected not to store) a mark or other indication associated with the selected other user in the radar object, total score manager 442 may send the radar object to visibility manager 452.

Visibility manager 452 may receive the radar object and determine the visibility and notification status of the other user selected in the object as described above. In one embodiment visibility manager 452 may retrieve visibility level of the other user selected in the radar object from user information storage 492.

If notification is required for the selected other user, such as if the selected other user's visibility level is set to "visible with permission", as described above, visibility manager 452 may send a notification message to handset user interface manager 570 of the other user and visibility manager 452 may listen for a permission response.

Handset user interface manager 570 receives the notification message and requests permission from the selected other user. When handset user interface manager 452 receives permission from the selected other user, it sends a permission notification back to visibility manager 452 in response.

When visibility manager 452 receives the permission response from handset user interface manager 570, visibility manager 452 may store the received permission in user information storage 492 with the user identifier of the other user from which the permission is received and the user for which the permission is received. In one embodiment, the permission response may also be stored with a timestamp for when the permission is received.

If the selected other user's visibility level is set to "visible to everyone", as described above, or if notification is required and permission is stored for the selected other user in user information storage 492 associated with selected other user's user identifier and the user identifier of the user for which the permission is received, then visibility manager 452 may send display information, as described above, to handset user interface manager 570 of the other user along with an indication to display information corresponding to the selected other user to the user corresponding to the radar object. Display information corresponding to the selected other user may include the distance from the operator of the handset device to the selected other user or the distance(s) from the handset operator to one or more public meeting space within the handset operator's maximum threshold distance, the location identifier and/or map location and name of any such public meeting spaces nearby both users (the user and the other user), a photo and other information from the other user's profile, an indication of the compatibility score as described above, and one or more links corresponding to the selected other user's profile information.

In one embodiment, if the selected other user's visibility level is set to "visible to everyone", as described above, then visibility manager 452 may not retrieve the selected other user's notification status.

In one embodiment, visibility manager 452 sends the display information for the other user to handset user interface manager 570 and marks the selected other user for which the display information is sent as displayed in the radar object, and visibility manager 452 may send the radar object to other user selection manager 428. Display information may include the other users' current location or distance from the user or both and the identifier of the other user.

Other user selection manager 428 receives the radar object from visibility manager 452 and, if there are additional other users in the radar object that have not yet been processed as described above, other user selection manager 428 may mark the user identifier of the next other user in the radar object. When other user selection manager 428 has marked the next other user identifier in the radar object, it sends the radar object to friend/date manager 430, and the process described is continued with the next selected other user. In one embodiment, other user selection manager 428 may unmark the previously marked other user identifier in the radar object, or other user selection manager 428 may mark the previously marked other user as previously selected or processed, or otherwise mark the previous selection as already processed in any other way.

In one embodiment, if there are no more other users identified as within the maximum distance threshold of the user corresponding to the radar object to process as described above, then other user selection manager 428 may destroy or otherwise discard the radar object. Information from all other users in the radar object may be sent to handset user interface manager 570 of the user at the same time before destroying the object instead of sending it one at a time. Other user selection manager 428 may also signal distance matching manager 420 to build a new radar object, and distance matching manager 420 may receive the signal.

If additional users exist for which to identify nearby potential matches in user information storage 492, distance matching manager 420 may select the next user and build a radar object including the user identifier of the selected user, as described above. Distance matching manager 420 may select any number of users, and distance matching manager 420 may build a radar object for any number of selected users. Distance matching manager 420 may send any radar objects to vehicle detection manager 422 as described above, and the new radar object may be processed in a manner similar to the manner in which the first radar object is processed above.

If additional users do not exist in user information storage 492 for which to identify nearby potential matches, distance matching manager 420 may wait.

Handset user interface manager 570 receives display information from visibility manager 452, and handset user interface manager 570 may display such information to the user received as described above, including the other users that have been identified as nearby potential matches for the selected user, location or distance information including the distance calculated between the selected user and such identified nearby potential matches and/or any public meeting spaces information about public meeting spaces within the selected user's maximum distance threshold, and a link to view the profile information corresponding to any displayed nearby potential matches, as well as a color dot, such as a green, yellow, or red dot, indicating if the nearby potential match is a very good match for the selected user or a fairly good match or a somewhat good match, as described above.

If the user requests to view profile information corresponding to a nearby potential match identified and displayed for the user, such as by clicking a view profile link corresponding to a specific displayed nearby potential match provided by handset user interface manager 570, handset user interface manager 570 may receive the match-specific link and sends the user identifier associated with the match-specific link on which the user has clicked to profile retrieval manager 470.

Profile retrieval manager 470 receives the user identifier from handset user interface manager 570 and retrieves profile information corresponding to the received user identifier from user information storage 492. Profile retrieval manager 470 may record the request (including the user identifier) in user information storage 492 and send the retrieved profile information to handset user interface manager 570, which may receive the profile information and display such information to the user, as described above. In one embodiment, the distance or distances and scores and public meeting space information are provided with the other information of the other users to handset user interface manager 570, and such information is provided to profile retrieval manager 470 with the user identifier, and such information is stored in user information storage 492 by profile retrieval manager 470 with the request. When handset user interface manager 570 has displayed profile information corresponding to the selected nearby potential match, the user may request an action, such as requesting to send a message to the selected nearby potential match, or requesting to add the selected nearby potential match as a friend, or requesting to go back, or any other action, as described above.

If the user requests to go back, such as by clicking a back link provided by handset user interface manager 570, handset user interface manager 570 may receive the request and re-display the nearby potential matches previously displayed to the user.

If the user requests to send a message to the selected nearby potential match, such clicking on a send message link provided by handset user interface manager 570, handset user interface manager 570 receives the request and may provide suitable user interface elements to allow the user to provide message information, such as a chat message or an email message. The user provides the message information, and handset user interface manager 570 receives the message from the user and send the message to message manager 484. In one embodiment, handset user interface manager 570 may send the message to message manager 484 with the user identifier of the owner of the handset device (i.e. user sending the message) and the user identifier of the selected nearby potential match for which the message is intended, along with the distances and scores.

Message manager 484 may receive any messages received from handset user interface manager 570 of any number of user systems 310, and message manager 484 may record the information it receives in user information storage 492 and forward any such messages to handset user interface manager 570 using conventional chat or email methods. In one embodiment, message manager 484 may record the user's message or the user's request to send the message in user information storage 492 along with the user identifier of the message sender, the message recipient and the date and the time indicating when the message is sent.

If the user requests to add the displayed nearby potential match as a friend 282, such as by clicking an add as friend link provided by handset user interface manager 570, handset user interface manager 570 may receive such a request and send the request to friend manager 488, which may receive the friend request, including the user identifier of the user requesting to add the friend and the user to which the friend request is sent and the distance information and scores, and friend manager 488 may send the friend request to handset user interface manager 570 corresponding to the user for which the request to add the friend is received and record such information and the request into user information storage 492. Handset user interface manager 570 may display such a request to the user and receive a response from the friend requested user.

If the friend requested user accepts the request, handset user interface manager 570 sends the response to friend manager 488, which records the accepted friend request in user information storage 492 associated with the user identifier of the user requesting the friendship and the user identifier of the user accepting the friendship.

If the friend requested user does not accept the request, or denies the request, handset user interface manager 570 may send the response to friend manager 488, which records the denial, or may not send a response to friend manager 488.

As described herein, user information storage 492, location storage 494, and base storage 496 may include conventional computer memory or disc storage and may include a conventional database. Any or all of other user selection manager 428, friends/date manager 430, compatibility manager 438, distance manager 440 and total score manager 442 may be considered to be a selection manager 444.

SUMMARY

There is described a method of displaying location information of at least one first user to a second user, the method including the steps of receiving location information from two or more third users comprising the at least one first user, and from the second user; receiving from the second user information indicating at least one preference for two or more of characteristics of other users; receiving from each of the two or more third users information comprising a plurality of characteristics of that user; selecting the at least one first user from the two or more third users responsive to the current locations of two or more the third users and the second user, the preference of the second user and the characteristics of the two or more the third users; and displaying to the second user information responsive to the location information of the at least one first user selected.

The method may include a feature wherein the selecting step is additionally responsive to a distance between an object and the locations of the plurality of third users and the distance between the object and the second user. The object may be a public meeting space.

The method may additionally include receiving identifiers of friends of the second user and friends of the plurality of third users; and may contain the feature wherein the selecting step is additionally responsive to at least one selected from a group comprising the identifiers of the friends of the plurality of third users and the identifiers of the friends of the second user.

The method may additionally include identifying an approximate a speed of travel of the second user responsive to the location information received; and may contain the additional feature wherein the selecting is additionally responsive to the speed of travel of the second user.

The method may include the feature wherein the selecting step is additionally responsive to a length of time the second user has been registered to a web site.

The method may additionally include notifying at least one of the at least one first users responsive to the selecting step; and receiving a response to the notification from at least one of the at least one first users notified; and may include the additional feature wherein the displaying for a given first user notified is responsive to the response received from that first user.

A system for displaying location information of at least one first user to a second user is described, the system including a GPS receipt manager having an input coupled for receiving location information from two or more third users comprising the at least one first user, and location information from the second user, the GPS receipt manager for providing at an output the location information; a profile/preference manager having an input for receiving from the second user information indicating at least one preference for two or more characteristics of other users and for receiving from each of the plurality of third users information comprising two or more characteristics of that user, the profile/preference manager for providing at an output the at least one preference and the information comprising the plurality of characteristics; a selection manager having an input coupled to the GPS receipt manager output for receiving the location information and to the profile/preference manager for receiving the at least one preference and the information comprising the plurality of characteristics, the selection manager for selecting the at least one first user from the plurality of third users responsive to the current locations of the third users and the second user, the preference of the second user and the characteristics of the plurality of the third users and providing at an output information responsive to the location information of the at least one first user selected; and a visibility manager having an input coupled to the selection manager output for receiving the information responsive to the location information of the at least one first user selected, the visibility manager for providing for display to the second user the information responsive to the location information of the at least one first user selected.

The system may contain an additional feature whereby the selection manager input is additionally for receiving a location of at least one object; and the selection manager selects the at least one first user from the plurality of third users additionally responsive to a distance between at least one of the at least one object and the locations of the plurality of third users and the distance between at least one of the at least one object and the location of the second user. The object may be a public meeting space.

The system may include an additional feature whereby the selection manager input is additionally for receiving identifiers of friends of the second user and friends of the plurality of third users; and the selection manager selects the at least one first user from the plurality of third users additionally responsive to at least one selected from a group comprising the identifiers of the friends of the plurality of third users and the identifiers of the friends of the second user.

The system may additionally include a vehicle detection manager having an input coupled to the GPS receipt manager output for receiving at least some of the location information of the second user, the vehicle detection manager for substantially identifying and providing at an output a speed of travel of the second user responsive to the at least some of the location information and for providing an indicia of speed of the second user responsive to the at least some of the location information; and may contain an additional feature whereby the selection manager input is additionally coupled to the vehicle detection manager output for receiving the indicia of speed of the second user, and the selection manager selects the at least one first user from the plurality of third users additionally responsive to the speed of travel of the second user.

The system may additionally include a thresholds manager having an input coupled for receiving a length of time the second user has been registered to a web site, the thresholds manager for computing and providing at an output at least one threshold responsive to the length of time received at the thresholds manager input; and may contain an additional feature whereby the selection manager input is additionally coupled to the thresholds manager output for receiving the at least one threshold, and the selection manager selects the at least one first user from the plurality of third users additionally responsive to at least one of the at least one threshold.

The system may contain an additional feature whereby the visibility manager is additionally for sending a message to at least one of the at least one first user via the visibility manager output to which a response having content may be received by the visibility manager; and the visibility manager provides the location information responsive to at least one selected from a group comprising whether a response was received and the content of any response received.

A computer program product including a computer useable medium having computer readable program code embodied therein is described for displaying location information of at least one first user to a second user, the computer program product including computer readable program code devices configured to cause a computer system to receive location information from two or more third users comprising the at least one first user, and from the second user; receive from the second user information indicating at least one preference for two or more characteristics of other users; receive from each of the plurality of third users information comprising two or more characteristics of that user; select the at least one first user from the plurality of third users responsive to the current locations of at least some of the third users and the second user, the preference of the second user and the characteristics of the plurality of the third users; and display to the second user information responsive to the location information of the at least one first user selected.

The computer program product may contain an additional feature whereby the computer readable program code devices configured to cause the computer system to select are additionally responsive to a distance between an object and the locations of the plurality of third users and the distance between the object and the second user. The object may be a public meeting space.

The computer program product may additionally include computer readable program code devices configured to cause the computer system to receive identifiers of friends of the second user and friends of the plurality of third users; and may contain an additional feature whereby the computer readable program code devices configured to cause the computer system to select are additionally responsive to at least one selected from a group comprising the identifiers of the friends of the plurality of third users and the identifiers of the friends of the second user.

The computer program product may additionally include computer readable program code devices configured to cause the computer system to substantially identify a speed of travel of the second user responsive to the location information received; and may contain an additional feature whereby the computer readable program code devices configured to cause the computer system to select are additionally responsive to the speed of travel of the second user.

The computer program product may contain an additional feature whereby the computer readable program code devices configured to cause the computer system to select are additionally responsive to a length of time the second user has been registered to a web site.

The computer program product may additionally include computer readable program code devices configured to cause the computer system to notify at least one of the at least one first users responsive to the selecting step; and receive a response to the notification from at least one of the at least one first users notified; and may contain an additional feature whereby the computer readable program code devices configured to cause the computer system to display for a given first user notified are responsive to the response received from that first user.

What is claimed is:

1. A method of displaying location information of at least one first user to a second user, comprising:
   receiving, at a computer system comprising a hardware processor coupled to a memory, location information from a device of each of a plurality of third users comprising the at least one first user, and from a device of the second user;
   receiving, at the computer system comprising the hardware processor coupled to the memory, from the second user, information indicating at least one preference for a plurality of characteristics of other users;
   receiving, at the computer system comprising the hardware processor coupled to the memory, from each of the plurality of third users, information comprising a plurality of characteristics of that user;

receiving information regarding a friendship between the second user and each of at least one of the third users in the plurality;

calculating, at the computer system comprising the hardware processor coupled to the memory, a distance between each of the plurality of third users and the second user;

selecting, at the computer system comprising the hardware processor coupled to the memory, the at least one first user from the plurality of third users in response to the current locations of the plurality of third users and the second user, the information indicating the at least one preference from the second user, and the plurality of characteristics of the plurality of the third users;

filtering at least one of the plurality of the third users or at least one of the at least one first user if the friendship information indicates said at least one of the plurality of third users or said at least one of the at least one first user is a friend of the first user; and providing, from the computer system comprising the hardware processor coupled to the memory, for display to the second user, information in response to the location information of the at least one first user selected and not filtered.

2. The method of claim 1 wherein the information regarding the at least one friendship is received from at least one social network.

3. The method of claim 1
wherein the information regarding the at least one friendship comprises at least one action between at least one third user in the plurality of third users and the second user.

4. The method of claim 1 additionally comprising:
substantially identifying a speed of travel of the second user in response to the location information received,
wherein the selecting step is additionally in response to the speed of travel of the second user.

5. The method of claim 1 wherein the selecting step is additionally in response to a length of time the second user has been registered to a web site.

6. The method of claim 1 additionally comprising:
notifying at least one of the at least one first users in response to the selecting step; and
receiving a response to the notification from at least one of the at least one first users notified,
wherein the displaying step for a given first user notified is in response to the response received from that first user.

7. A system for displaying location information of at least one first user to a second user, comprising:
a GPS receipt manager comprising a hardware processor system coupled to a memory system and having an input coupled for receiving location information from a device of each of a plurality of third users comprising the at least one first user, and location information from a device of the second user, the GPS receipt manager for providing at an output the location information;
a profile/preference manager comprising the hardware processor system coupled to the memory system and having an input for receiving from the second user information indicating at least one preference for a plurality of characteristics of other users and for receiving from each of the plurality of third users information comprising a plurality of characteristics of that user, the profile/preference manager for providing at an output the at least one preference and the information comprising the plurality of characteristics;
a social network manager having an input for receiving information regarding at least one friendship between the second user and each of at least one of the third users in the plurality, the social network manager for providing at an output the information regarding at least one friendship;
a distance manager comprising the hardware processor system coupled to the memory system and having an input coupled to the GPS receipt manager for receiving the location information and for receiving a location of at least one object different from any of the plurality of third users, the location different from a location of the second user, the distance manager for calculating at least one distance between each of the location of the plurality of third users and the location of the second user and providing at an output, for each of the at least one object, the at least one distance calculated;
a selection manager comprising the hardware processor system coupled to the memory system and having an input coupled to the distance manager output for receiving the distance information and to the profile/preference manager for receiving the at least one preference and the information comprising the plurality of characteristics, the selection manager for selecting the at least one first user from the plurality of third users in response to the preference from the second user, the plurality of characteristics of the plurality of the third users and the distance information, and providing at an output information in response to the location information of the at least one first user selected;
a friend/date manager having an input coupled to the social network manager output for receiving the information regarding at least one friendship, and to the selection manager output for receiving at least some of the information in response to the location information of the at least one first user selected, the friend/date manager for identifying and providing at an output at least one indicator identifying at least one of the at least one first user as a friend of the second user; and
a visibility manager comprising the hardware processor system coupled to the memory system and having an input coupled to the selection manager output for receiving the information in response to the location information of the at least one first user selected, and to the friend/date manager output for receiving the at least one indicator identifying at least one of the at least one first user selected as a friend of the second user, the visibility manager for providing for display to the second user the information in response to the location information of the at least one first user selected excluding the at least one of the at least one first user identified by the at least one indicator as a friend of the second user.

8. The system of claim 7 wherein the information regarding the at least one friendship is received from at least one social network.

9. The system of claim 7 wherein; and
the information regarding the at least one friendship comprises at least one action between at least one third user in the plurality of third users and the second user.

10. The system of claim 7 additionally comprising:
a vehicle detection manager comprising the hardware processor system coupled to the memory system and having an input coupled to the GPS receipt manager output for receiving at least some of the location information of the second user, the vehicle detection manager for substantially identifying and providing at an output a speed of travel of the second user in response to the at least some of the location information and for providing an indicia of speed of the second user in response to the at least some of the location information, wherein the selection manager input is additionally coupled to the vehicle detection manager output for receiving the indicia of speed of the second user, and the selection manager selects the at least one first user from the plurality of third users additionally in response to the speed of travel of the second user.

11. The system of claim 7:

additionally comprising a thresholds manager comprising the hardware processor system coupled to the memory system and having an input coupled for receiving a length of time the second user has been registered to a web site, the thresholds manager for computing and providing at an output at least one threshold in response to the length of time received at the thresholds manager input; and wherein the selection manager input is additionally coupled to the thresholds manager output for receiving the at least one threshold, and the selection manager selects the at least one first user from the plurality of third users additionally in response to at least one of the at least one threshold.

12. The system of claim 7, wherein:

the visibility manager is additionally for sending a message to at least one of the at least one first user via the visibility manager output to which a response having content may be received by the visibility manager; and the visibility manager provides the location information in response to at least one selected from a group comprising whether a response was received and the content of any response received.

13. A computer program product comprising a non-transitory computer useable medium having computer readable program code embodied therein for displaying location information of at least one first user to a second user, the computer program product comprising computer readable program code devices configured to cause a computer system to:

receive location information from a device of each of a plurality of third users comprising the at least one first user, and from a device of the second user;

receive from the second user information indicating at least one preference for a plurality of characteristics of other users;

receive from each of the plurality of third users information comprising a plurality of characteristics of that user;

receive information regarding a friendship between the second user and each of at least one of the third users in the plurality;

calculate, at the computer system comprising the hardware processor coupled to the memory, a distance between each of the plurality of third users and the second user;

select the at least one first user from the plurality of third users in response to the current locations of at least some of the plurality of third users and the second user, the information indicating the at least one preference from the second user, and the plurality of characteristics of the plurality of the third users; and filter at least one of the plurality of the third users or at least one of the at least one first user if the friendship information indicates said at least one of the plurality of third users or said at least one of the at least one first user is a friend of the first user;

display to the second user information in response to the location information of the at least one first user selected and not filtered.

14. The computer program product of claim 13 wherein the information regarding the at least one friendship is received from at least one social network.

15. The computer program product of claim 13 wherein the information regarding the at least one friendship comprises at least one action between at least one third user in the plurality of third users and the second user.

16. The computer program product of claim 13 additionally comprising:

computer readable program code devices configured to cause the computer system to substantially identify a speed of travel of the second user in response to the location information received, wherein the computer readable program code devices configured to cause the computer system to select are additionally in response to the speed of travel of the second user.

17. The computer program product of claim 13 wherein the computer readable program code devices configured to cause the computer system to select are additionally in response to a length of time the second user has been registered to a web site.

18. The computer program product of claim 13 additionally comprising:

computer readable program code devices configured to cause the computer system to:

notify at least one of the at least one first users in response to the selecting step; and receive a response to the notification from at least one of the at least one first users notified, wherein the computer readable program code devices configured to cause the computer system to display for a given first user notified are in response to the response received from that first user.

* * * * *